(12) United States Patent
Abe

(10) Patent No.: US 7,128,050 B1
(45) Date of Patent: Oct. 31, 2006

(54) AIR INTAKE APPARATUS FOR INTERNAL COMBUSTION ENGINE

(75) Inventor: Kazuyoshi Abe, Susono (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/155,916

(22) Filed: Jun. 16, 2005

(51) Int. Cl.
*F02B 31/06* (2006.01)
*F02B 31/08* (2006.01)

(52) U.S. Cl. .................. 123/306; 123/308; 123/188.14

(58) Field of Classification Search ........... 123/188.14, 123/306, 308
See application file for complete search history.

(56) References Cited

U.S. PATENT DOCUMENTS

| | | | | |
|---|---|---|---|---|
| 5,273,014 | A | * | 12/1993 | Mitobe et al. ............. 123/308 |
| 5,551,392 | A | * | 9/1996 | Yamaji et al. ............. 123/306 |
| 5,878,712 | A | * | 3/1999 | Wolters et al. ............. 123/308 |
| 2005/0155570 | A1 | * | 7/2005 | Confer et al. ............. 123/306 |

FOREIGN PATENT DOCUMENTS

| | | |
|---|---|---|
| JP | A 06-167220 | 6/1994 |
| JP | A 06-264816 | 9/1994 |
| JP | U 07-25230 | 5/1995 |
| JP | A 07-174028 | 7/1995 |
| JP | A 08-296535 | 11/1996 |
| JP | A 11-107763 | 4/1999 |
| JP | A 2004-124836 | 4/2004 |

OTHER PUBLICATIONS

Japanese Institute of Invention and Innovation Technical Report No. 2004-506473; Oct. 1, 2004.

* cited by examiner

*Primary Examiner*—Erick R. Solis
(74) *Attorney, Agent, or Firm*—Oliff & Berridge, PLC

(57) ABSTRACT

In an air intake apparatus for an engine, an intake port is connected to a cylinder of the engine and an intake valve opens and closes a downstream end of the intake port. The air intake apparatus includes a partition wall provided along a longitudinal direction of the intake port so as to cross-sectionally partition the intake port into two sections, and an intake control valve provided in a pipe forming the intake port, opening and closing a first flow path implemented by partition by the partition wall, and closing the first flow path and narrowing a second flow path. Assuming a sliding direction of a piston within cylinder as an up-down direction, the intake port is partitioned into two upper and lower sections.

11 Claims, 10 Drawing Sheets

F I G. 4
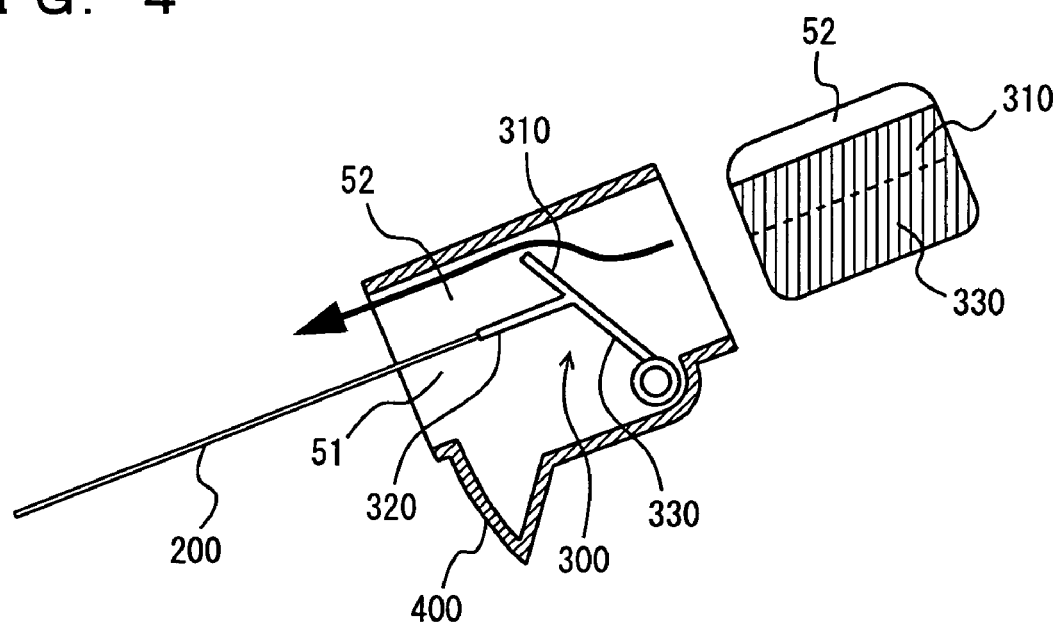

F I G. 7
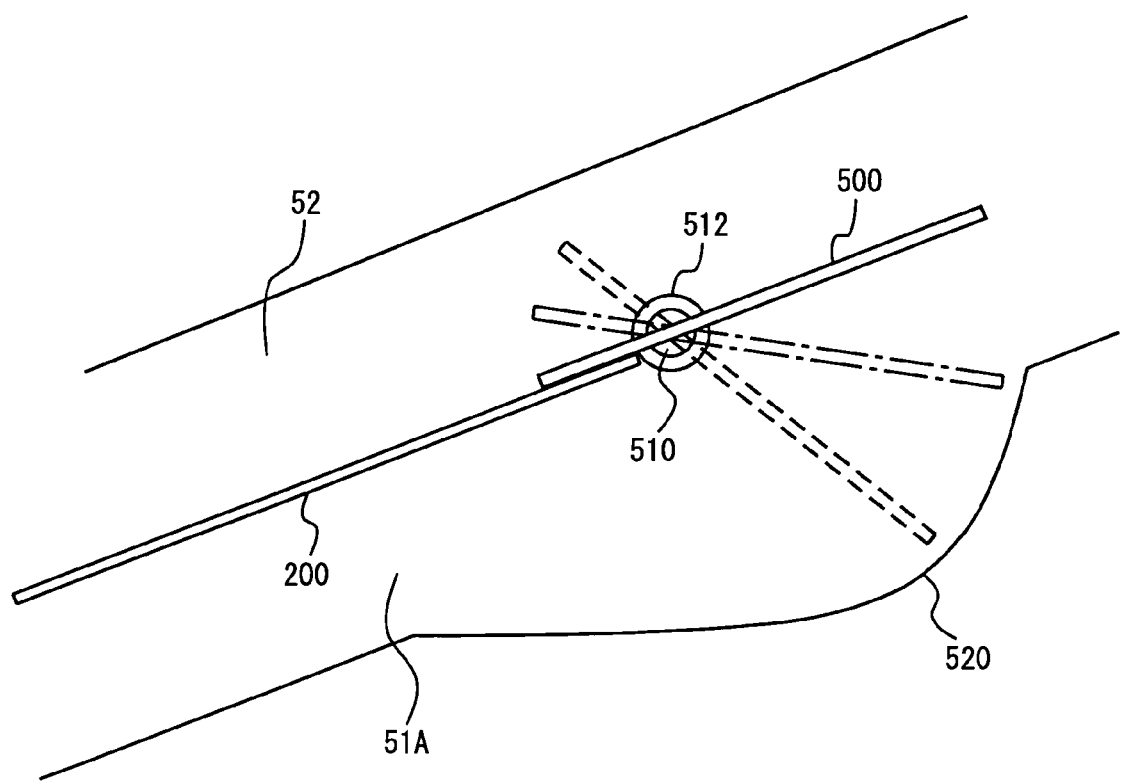

AIR INTAKE APPARATUS FOR INTERNAL COMBUSTION ENGINE

FIELD OF THE INVENTION

The present invention relates to an air intake apparatus for an internal combustion engine including an intake port connected to a cylinder, and more particularly to an air intake apparatus strengthening gas flow such as tumble (vertical flow) within the cylinder in accordance with an operation state of the internal combustion engine.

DESCRIPTION OF THE BACKGROUND ART

For example, in order to attain stable combustion of a lean air-fuel mixture in a spark ignition type internal combustion engine, gas flow within the cylinder such as tumble or swirl (lateral flow) is extremely important, and such gas flow should be strengthened in a wider operation region.

Particularly in a low-load region among the operation regions of the internal combustion engine in which a throttle opening is small and an intake air quantity is correspondingly small, generally, an air-fuel mixture is made slightly richer in order to stabilize combustion. Accordingly, fuel efficiency or emission tends to deteriorate. In order to improve fuel efficiency or emission, it is effective to generate whirls of intake air within the cylinder, to promote combustion by using strong turbulent flow. That is, tumble or swirl is generated in the intake air.

Here, the swirl refers to flow of the intake air along a circumferential wall of the cylinder. The swirl is effective in homogenizing the intake air, whereas less effective in promoting combustion by generating turbulent flow. On the other hand, the tumble refers to flow of the intake air along an axial direction of the cylinder. As the tumble breaks up in a latter half of compression stroke, strong turbulent flow is generated. Therefore, the tumble is effective as a measure to improve combustion in a low-load region of the engine.

An example of such a method of strengthening gas flow (swirl and tumble) within the cylinder includes a method of using an intake control valve partially blocking a cross-section of a passage of the intake port to cause intake air flow within the intake port to be present locally on one side of the intake port. For example, in order to generate tumble, an intake control valve is disposed in a lower portion of the intake port, so that the intake air flows locally through an upper portion of the intake port. The tumble within the cylinder is thus strengthened.

That is, when gas flow is strengthened, the cross-sectional area of the passage of the intake port is substantially made smaller by the intake control valve. Here, a ratio of the cross-sectional area of the passage effective with respect to a reference intake port cross-sectional area is defined as "opening ratio." Generally, the smaller the opening ratio is, the stronger the gas flow is. On the other hand, if the opening ratio is small, fluid resistance is increased and a quantity of intake air that can be taken into the cylinder is decreased. Accordingly, an operation condition allowing strengthening of gas flow by closing the intake control valve is limited to a relatively narrow range. Japanese Patent Laying-Open No. 2004-124836 discloses an air intake apparatus for an internal combustion engine capable of strengthening gas flow within a cylinder without excessively lowering the opening ratio. The air intake apparatus for an internal combustion engine in which an intake port is connected to a cylinder of the internal combustion engine and an intake valve opens and closes a downstream end of the intake port includes a partition wall provided along a longitudinal direction of the intake port so as to cross-sectionally partition the intake port into two sections, an intake control valve located in proximity of an upstream end of the partition wall and opening and closing one flow path implemented by partition by the partition wall, and a communication path for communication between two flow paths implemented by partition by the partition wall at a position close to the intake control valve.

According to the air intake apparatus for the internal combustion engine, when the intake control valve is at a closing position for blocking one flow path, the intake air flows toward the cylinder side only through the other flow path, so that a relatively large quantity of intake air flows into the cylinder through a portion around the intake valve closer to one side. At the same time, the intake control valve narrows the intake air flow, to cause local pressure lowering on the downstream side of the intake control valve, which in turn influences on the communication path. As such, a pressure difference is generated between the downstream end of one flow path blocked by the intake control valve and the communication path, intake air is suctioned from the end portion and flows backward to the upstream side of the intake port, and the intake air merges into the other flow path through the communication path. In other words, a part of the intake air returns to the upstream side via the blocked flow path. Then, flow rate or flow velocity of the intake air flow passing a portion around the intake valve is further unbalanced, so as to effectively strengthen gas flow within the cylinder. Consequently, according to the air intake apparatus for the internal combustion engine, a part of the intake air can return via the flow path blocked by the intake control valve, so as to effectively improve gas flow within the cylinder. Particularly, stronger gas flow can be obtained without lowering the opening ratio by means of the intake control valve. Therefore, increase in pumping loss due to increase in fluid resistance can be suppressed and a larger quantity of intake air flowing into the cylinder can be ensured, so that gas flow can be strengthened in a wider operation region.

On the other hand, in the air intake apparatus for the internal combustion engine disclosed in Japanese Patent Laying-Open No. 2004-124836, a communication path for returning a part of the intake air to the upstream side via the blocked flow path should be provided in the partition wall. Provision of a communication path causes a further complicated structure of an intake manifold including the intake control valve. In addition, a partition wall should be provided in the air intake apparatus for the internal combustion engine disclosed in this publication. Provision of the partition wall greatly contributes to strengthening of a current, however, causes further complicated structure of the intake manifold including the intake control valve.

SUMMARY OF THE INVENTION

An object of the present invention is to provide an air intake apparatus for an internal combustion engine strengthening airflow within a cylinder such as tumble without complicating a structure.

In an air intake apparatus for an internal combustion engine according to one aspect of the present invention, an intake port is connected to a cylinder of the internal combustion engine and an intake valve opens and closes a downstream end of the intake port. The air intake apparatus includes: a partition wall provided along a longitudinal direction of the intake port so as to cross-sectionally partition the intake port into two sections; and an intake control valve provided in a pipe forming the intake port and having an opening/closing mechanism opening and closing a first flow path implemented by partition by the partition wall and a valve element pivoted by the opening/closing mechanism and having a blocking plate for closing the first flow path and narrowing a second flow path different from the first flow path. If a sliding direction of a piston within the cylinder is assumed as an up-down direction, the two sections are implemented as upper and lower sections.

Preferably, the intake control valve attains a first state in which the first flow path is opened by the opening/closing mechanism and the second flow path is not narrowed by the blocking plate, a second state in which the first flow path is closed by the opening/closing mechanism and the second flow path is not narrowed by the blocking plate, and a third state in which the first flow path is closed by the opening/closing mechanism and the second flow path is narrowed by the blocking plate.

More preferably, the air intake apparatus further includes a control unit for switching between the first state, the second state, and the third state, in accordance with three operation regions set in advance based on at least one of a temperature of the internal combustion engine and an intake air quantity.

More preferably, the control unit controls the intake control valve so as to attain the first state in accordance with the first operation region, controls the intake control valve so as to attain the second state in accordance with the second operation region, and controls the intake control valve so as to attain the third state in accordance with the third operation region. In the first operation region, the intake air quantity is large, and in the third operation region, the temperature of the internal combustion engine is low.

More preferably, the opening/closing mechanism has a rotation shaft for the valve element to pivot around a position in a wall surface of the pipe. The valve element is constituted of a dogleg-shaped flat plate and a blocking plate extending straight from a bent point of the flat plate. The dogleg-shaped flat plate has a first end portion supported by the rotation shaft. In the third state, a gap is formed between an end portion of the blocking plate and the wall surface of the pipe to narrow the second flow path, and a second end portion of the dogleg-shaped flat plate opposite to the first end portion continues substantially in line with the partition wall to close the first flow path. In the second state, the end portion of the blocking plate and the partition wall are connected to each other, to close the first flow path. In the first state, the blocking plate extends along and in parallel to the wall surface of the pipe, to implement the first flow path and the second flow path.

More preferably, in the wall surface of the pipe, an accommodation portion accommodating the second end portion in the first state is provided in a manner projecting in a radial direction of the pipe.

More preferably, the opening/closing mechanism has a rotation shaft for the valve element to pivot around a substantially central position of the pipe. The valve element is implemented by a flat plate and supported by the rotation shaft at a position displaced from a center of the flat plate. The first flow path has an expanded portion expanded in a radial direction of the pipe and having a shape conforming to an end portion of a longer-length portion of the flat plate serving as the valve element. In the third state, an inner wall of the expanded portion and the end portion of the longer-length portion are connected to each other to close the first flow path and an end portion of a shorter-length portion opposite to the end portion of the longer-length portion protrudes, so as to narrow the second flow path. In the second state, the inner wall of the expanded portion and the end portion of the longer-length portion are connected to each other to close the first flow path and the end portion of the shorter-length portion opposite to the end portion of the longer-length portion protrudes in a degree lower than in the first state, so as to narrow the second flow path. In the first state, the flat plate and the partition wall are caused to extend substantially in line, to implement the first flow path and the second flow path.

An air intake apparatus for an internal combustion engine according to another aspect of the present invention includes an intake control valve provided in a pipe forming the intake port and having a valve element and an opening/closing mechanism pivoting the valve element. The opening/closing mechanism has a rotation shaft for the valve element to pivot around a position in a wall surface of the pipe. If a sliding direction of a piston within the cylinder is assumed as an up-down direction, the valve element is implemented by a plate-shaped member forming a gap between an upper end portion of the valve element and the wall surface of the pipe and having a lower end portion conforming to inner shape of the pipe so as to form no gap. The rotation shaft is provided in the lower end portion of the valve element.

More preferably, the intake control valve attains a third state in which the valve element is pivoted around the rotation shaft to an uppermost position, to form a gap between the upper end portion of the valve element and the wall surface of the pipe, a first state in which the valve element is pivoted around the rotation shaft to a lowermost position, to extend along and in parallel to the wall surface of the pipe, and a second state intermediate between the first state and the third state, An air intake apparatus for an internal combustion engine according to yet another aspect of the present invention includes an intake control valve provided in a pipe forming the intake port and having a valve element and an opening/closing mechanism pivoting the valve element. The opening/closing mechanism has a rotation shaft for the valve element to pivot around a position in a wall surface of the pipe. If a sliding direction of a piston within the cylinder is assumed as an up-down direction, the valve element is implemented by a plate-shaped member forming a gap between a lower end portion of the valve element and the wall surface of the pipe and having an upper end portion conforming to inner shape of the pipe so as to form no gap. The rotation shaft is provided in the upper end portion of the valve element.

An air intake apparatus for an internal combustion engine according to yet another aspect of the present invention includes an intake control valve provided in a pipe forming the intake port and having a valve element and an opening/closing mechanism pivoting the valve element. If a sliding direction of a piston within the cylinder is assumed as an up-down direction, the intake port is assumed to be partitioned into a first flow path and a second flow path. The opening/closing mechanism has a rotation shaft for the valve element to pivot around a substantially central position of the pipe. The valve element is implemented by a flat plate and supported by the rotation shaft at a position displaced from a center of the flat plate. The first flow path has an expanded portion expanded in a radial direction of the pipe and having a cross-sectional shape conforming to an end portion of a longer-length portion of the flat plate serving as the valve element. The intake control valve attains a third state in which an inner wall of the expanded portion and the end portion of the longer-length portion are connected to each other to close the first flow path and an end portion of a shorter-length portion opposite to the end portion of the longer-length portion protrudes so as to narrow the second flow path, a second state in which the inner wall of the expanded portion and the end portion of the longer-length portion are connected to each other to close the first flow path and the end portion of the shorter-length portion opposite to the end portion of the longer-length portion protrudes in a degree lower than in the first state, and a first state in which the flat plate and the partition wall are caused to extend substantially in line, to implement the first flow path and the second flow path.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 illustrates the air intake apparatus in FIG. 1 in a slightly-open state.

FIG. 7 is a partially enlarged view of FIG. 6.

DESCRIPTION OF THE PREFERRED EMBODIMENTS

Figure 1:
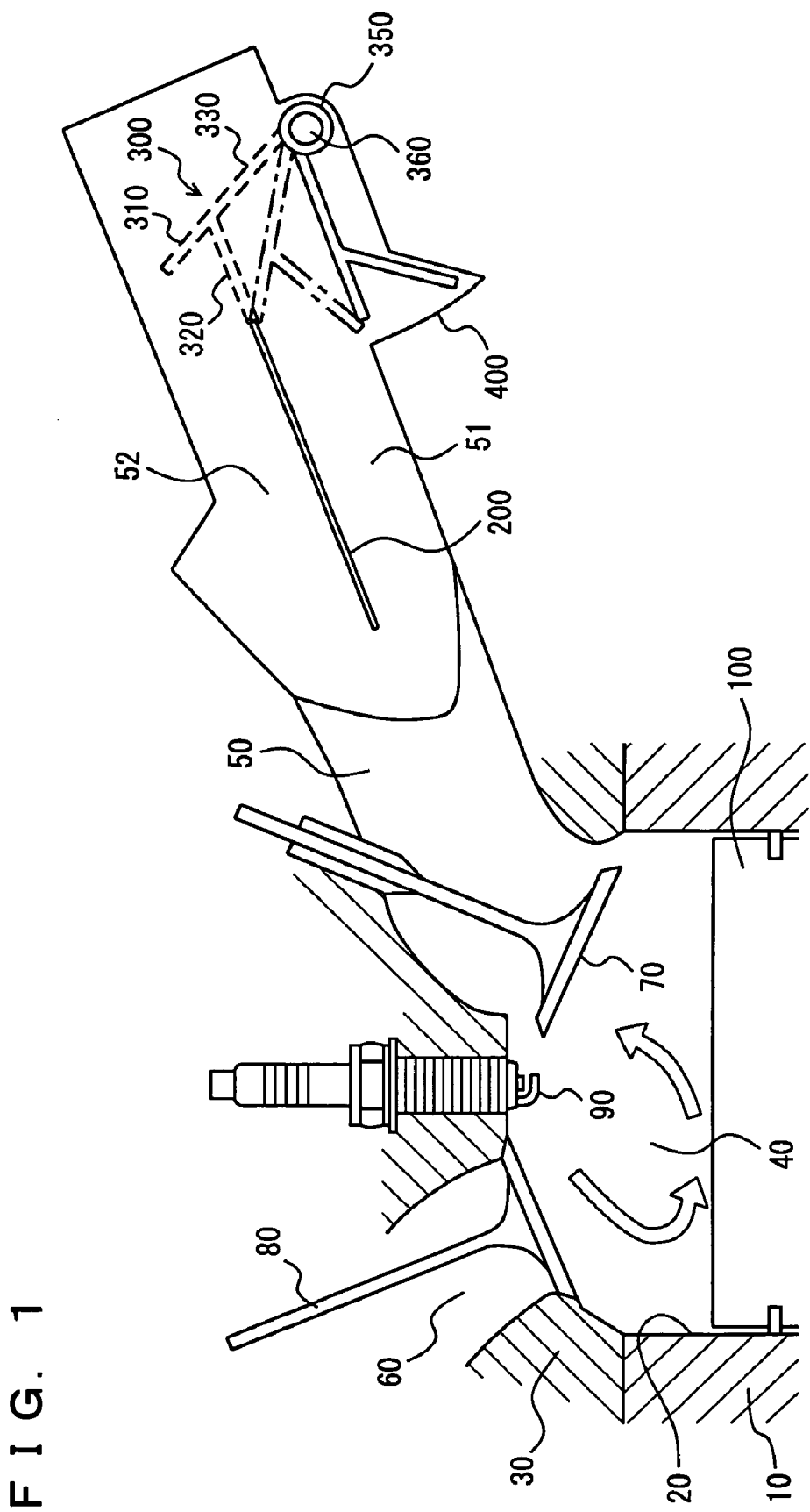
FIG. 1 is a cross-sectional view showing an overall structure of an air intake apparatus according to Embodiment 1 of the present invention.

Embodiments of the present invention will be described hereinafter with reference to the drawings. In the description below, the same elements have the same reference characters allotted, and their label and function are also identical. Therefore, detailed description thereof will not be repeated.

Embodiment 1

In the following, an air intake apparatus for an internal combustion engine according to Embodiment 1 of the present invention will be described. It is noted that the internal combustion engine shown below will be described as a spark ignition type gasoline engine. In addition, an injector provided in the engine may be an injector for injecting a fuel into an intake port, or an injector for injecting the fuel into the cylinder. Alternatively, an engine having both injectors may be adopted.

FIG. 1 shows an overall structure of the air intake apparatus for an internal combustion engine according to the present embodiment applied as an air intake apparatus for an in-cylinder direct injection spark ignition type gasoline engine. The air intake apparatus aims to strengthen the tumble as the gas flow.

As shown in FIG. 1, a cylindrically-shaped cylinder 20 is formed in a cylinder block 10, and a pent roof type combustion chamber 40 is provided in a cylinder head 30 covering a top portion. An intake port 50 and an exhaust port 60 are formed, i.e., opened in two sloped surfaces of combustion chamber 40. Here, an intake valve 70 opens and closes the end of intake port 50, whereas an exhaust valve 80 opens and closes the end of exhaust port 60. Intake port 50 has a tip end branched into two portions, respective ones of which are opened and closed by a pair of intake valves 70 provided in each cylinder. Similarly, a pair of exhaust valves 80 is also provided in each cylinder. A spark plug 90 is provided in a central portion of combustion chamber 40 in a manner surrounded by these four valves. Here, a piston 100 disposed in cylinder 20 is illustrated as having a simple shape of a flat top surface, because the piston does not represent a principal feature of the present invention. The piston, however, may be formed in a desired shape suitable for stratified charge combustion or the like, as necessary.

As shown in FIG. 1, in the present embodiment, a partition wall 200 is provided along a longitudinal direction of intake port 50, so as to cross-sectionally partition intake port 50 into two upper and lower sections. Partition wall 200 is fabricated, for example, by casting a separate metal plate when casting cylinder head 30. Partition wall 200 is disposed such that a downstream end of partition wall 200 is positioned as downstream as possible, that is, as close as possible to intake valve 70.

Here, as shown in FIG. 1, intake port 50 extends substantially straight in a longitudinal portion where partition wall 200 is present, and correspondingly, partition wall 200 extends also substantially straight. The partition wall, however, is not necessarily limited as such. If intake port 50 is curved, partition wall 200 curved in a similar manner is provided.

As is apparent to a person skilled in the art, the term "upper" or "lower" in connection with intake port 50, intake air flow or the like is based on an up-down direction of cylinder 20, and does not mean the absolute vertical direction in terms of space. In addition, the term "intake port" does not necessarily refer only to a portion inside cylinder head 30, but covers such an example that a part of an upstream side of the intake port is implemented by a part of other member outside cylinder head 30, such as a part of an intake manifold. In other words, the term "intake port" is assumed to cover a portion implemented by an intake manifold or the like separate from cylinder head 30.

In the portion where partition wall 200 is present, the space within intake port 50 is divided into a lower passage portion, that is, a first flow path 51, and an upper passage portion, that is, a second flow path 52. An intake control valve 300 is provided for each cylinder, so as to block lower first flow path 51 on an inlet side, that is, at an upstream end. Intake control valve 300 is provided on an extension line of partition wall 200, particularly adjacent to the upstream end portion of partition wall 200.

Intake control valve 300 is constituted of a dogleg-shaped flat plate and a blocking portion 310 extending straight from a bent point of the flat plate. The dogleg-shaped flat plate implements a partition wall connection portion 320 and a main portion 330. That is, intake control valve 300 is constituted of main portion 330 coupled to a rotation shaft 360, blocking portion 310 extending straight from main portion 330, and partition wall connection portion 320 branched from main portion 330.

Main portion 330 is coupled to rotation shaft 360, and rotation shaft 360 is supported by a rotation shaft supporting portion 350 such that intake control valve 300 is pivotable. Rotation shaft 360 is coupled to a rotation shaft of a motor controlled by an engine ECU (Electronic Control Unit), which rotates intake control valve 300.

In addition, an accommodation portion 400 for accommodating partition wall connection portion 320 is provided in lower first flow path 51.

Figure 2:
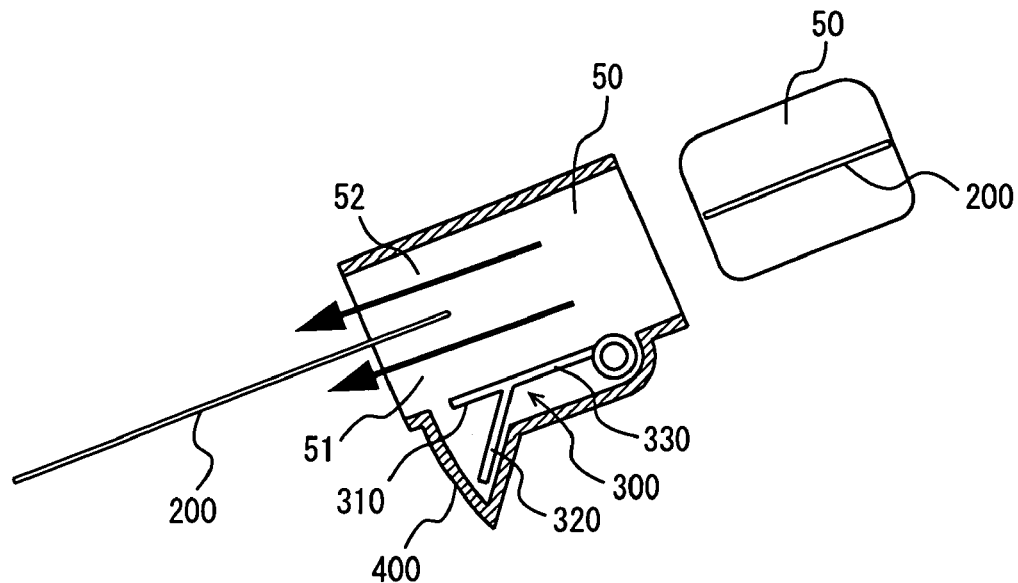
FIG. 2 illustrates the air intake apparatus in FIG. 1 in a full-open state.

As shown with a solid line in FIG. 1 as well as in FIG. 2, intake control valve 300 attains a full-open state as a first state. Here, intake control valve 300 pivots such that blocking portion 310 extends along and in parallel to the wall surface of intake port 50, thereby implementing lower first flow path 51 and upper second flow path 52. Here, partition wall connection portion 320 is stored in accommodation portion 400.

Figure 3:
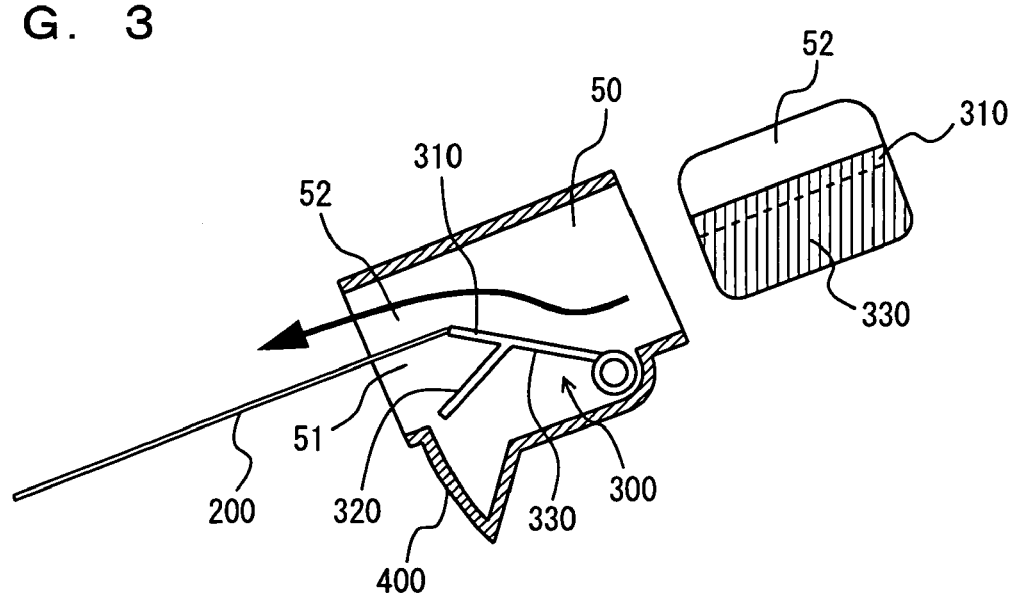
FIG. 3 illustrates the air intake apparatus in FIG. 1 in a half-open state.

As shown with a dashed line in FIG. 1 as well as in FIG. 3, intake control valve 300 attains a half-open state as a second state. Here, intake control valve 300 pivots such that blocking portion 310 is connected to the upstream end portion of partition wall 200, thereby closing lower first flow path 51. Here, partition wall connection portion 320 may be positioned to cover accommodation portion 400.

As shown with a dotted line in FIG. 1 as well as in FIG. 4, intake control valve 300 attains a slightly-open state as a third state. Here, intake control valve 300 pivots such that partition wall connection portion 320 is connected to the upstream end portion of partition wall 200, thereby closing lower first flow path 51. Here, a gap is formed between blocking portion 310 and upper second flow path 52, so as to narrow upper second flow path 52.

An effect of the structure described above will now be discussed. In the intake stroke, when intake valve 70 opens and piston 100 is lowered, intake air flows into cylinder 20 through the gap around intake valve 70.

Here, as shown in FIG. 2, if intake control valve 300 is at an open position, intake air flows through both of lower first flow path 51 and upper second flow path 52, and the intake air flows in substantially uniformly through a space around intake valve 70. Therefore, gas flow generated in cylinder 20 is relatively weak. Here, partition wall connection portion 320 is stored in accommodation portion 400 and does not serve as fluid resistance.

As shown in FIG. 3, if intake control valve 300 is at a half-open position, blocking portion 310 is connected to the upstream end portion of partition wall 200, so as to close lower first flow path 51. Therefore, intake air flows only through upper second flow path 52. Here, as partition wall connection portion 320 covers accommodation portion 400, it does not serve as fluid resistance.

Here, when intake control valve 300 is controlled to the half-open position as in FIG. 3, lower second flow path 52 is blocked, so that the intake air flows toward cylinder 20 side only through upper first flow path 51. In particular, the intake air flow is present locally along an upper inner wall surface of intake port 50, and there is little flow present along a lower inner wall surface of intake port 50. Therefore, when attention is paid to the space around intake valve 70, in a gap under intake valve 70, that is, in a gap closer to an outer perimeter of cylinder 20, flow rate of the intake air is small and flow velocity is also low. Meanwhile, in a gap above intake valve 70, that is, in a gap closer to spark plug 90, flow rate of the intake air is large and flow velocity is also high. Consequently, as shown with an arrow in FIG. 1, tumble (what is called forward tumble) flowing from intake valve 70 side toward exhaust valve 80 side and the top surface of piston 100 is generated in cylinder 20.

As shown in FIG. 4, if intake control valve 300 is at a slightly-open position, partition wall connection portion 320 is connected to the upstream end portion of partition wall 200, to close lower first flow path 51. A cross-sectional area of upper second flow path 52 is narrowed by blocking portion 310. Therefore, the intake air flows only through a part of the upper second flow path. Here, as partition wall connection portion 320 is connected to the upstream end portion of partition wall 200, accommodation portion 400 does not serve as fluid resistance.

Here, when intake control valve 300 is controlled to the slightly-open position as in FIG. 4, an effect similar to that when it is controlled to the half-open position is obtained. In other words, lower first flow path 51 is blocked, so that the intake air flows toward cylinder 20 side only through a part of upper second flow path 52. In particular, as compared with the case where intake control valve 300 is at the half-open position, the intake air flow is present further locally along the upper inner wall surface of intake port 50, and the flow along the lower inner wall surface of intake port 50 is further reduced. Therefore, when attention is paid to the space around intake valve 70, in a gap under intake valve 70, that is, in the gap closer to the outer perimeter of cylinder 20, flow rate of the intake air is small and flow velocity is also low. Meanwhile, in a gap above intake valve 70, that is, in the gap closer to spark plug 90, flow rate is large and flow velocity is also high. Consequently, as shown with the arrow in FIG. 1, tumble (what is called forward tumble) flowing from intake valve 70 side toward exhaust valve 80 side and the top surface of piston 100 is generated in cylinder 20.

An operation state of the engine corresponding to these three states (intermediate states of these may also be set) will now be described.

When a throttle valve of the engine is in a wide open throttle state (a first operation state), the engine ECU controls the motor coupled to rotation shaft 360 such that intake control valve 300 attains the full-open state which represents the first state. In this manner, corresponding to WOT (Wide Open Throttle), a quantity of air taken into combustion chamber 40 of the engine can be increased to enhance engine output.

If a temperature of the engine (in many cases, represented by a temperature of engine cooling water) is low (a third operation state), the engine ECU controls the motor coupled to rotation shaft 360 such that intake control valve 300 attains the slightly-open state which represents the third state. In this manner, corresponding to the cold state of the engine, the tumble generated within cylinder 20 can be strengthened to achieve further leaner lean limit, whereby fuel efficiency can be improved. This may be because of the following reason. Specifically, the tumble whirls the intake air along the axial direction of the cylinder. Then, the tumble breaks up in the latter half of the compression stroke and strong turbulent flow is generated. Accordingly, combustion is improved in the cold state of the engine.

If the engine is in a state intermediate (a second operation state) between the first operation state (WOT state) and the third operation state (cold state) described above, the engine ECU controls the motor coupled to rotation shaft 360 such that intake control valve 300 attains the half-open state which represents the second state. In this manner, corresponding to a partial throttle (intermediate) state of the engine, the tumble generated within cylinder 20 can be strengthened to improve combustion performance, whereby further leaner combustion can be realized and fuel efficiency can be improved. This may be because of the reason the same as in the third state described above. Specifically, the tumble whirls the intake air along the axial direction of the cylinder. Then, the tumble breaks up in the latter half of the compression stroke and a strong turbulent flow is generated. Accordingly, combustion is improved.

As described above, in accordance with the operation state of the engine, the cross-sectional area of the passage for the intake air is varied by means of the intake control valve for generating the tumble in the air intake apparatus. Here, the intake control valve is shaped, in consideration of connection with the partition wall upstream end portion and accommodation in the accommodation portion. Therefore, the airflow within the cylinder can be strengthened without a complicated structure.

It is noted that a length of blocking portion 310 blocking the upper passage portion, that is, second flow path 52 (determining the cross-sectional area of the second flow path) is set in accordance with strength of the tumble demanded for achieving improvement in the fuel efficiency in the cold state.

Embodiment 2

In the following, an air intake apparatus for an internal combustion engine according to Embodiment 2 of the present invention will be described. In the air intake apparatus for the internal combustion engine according to the present embodiment, intake control valve 300 provided in the lower first flow path in the air intake apparatus for the internal combustion engine according to Embodiment 1 described previously is replaced with an intake control valve 302 provided in the upper second flow path. As the structure of the engine or the like is otherwise similar to that in Embodiment 1 described above, detailed description thereof will not be repeated.

Figure 5:
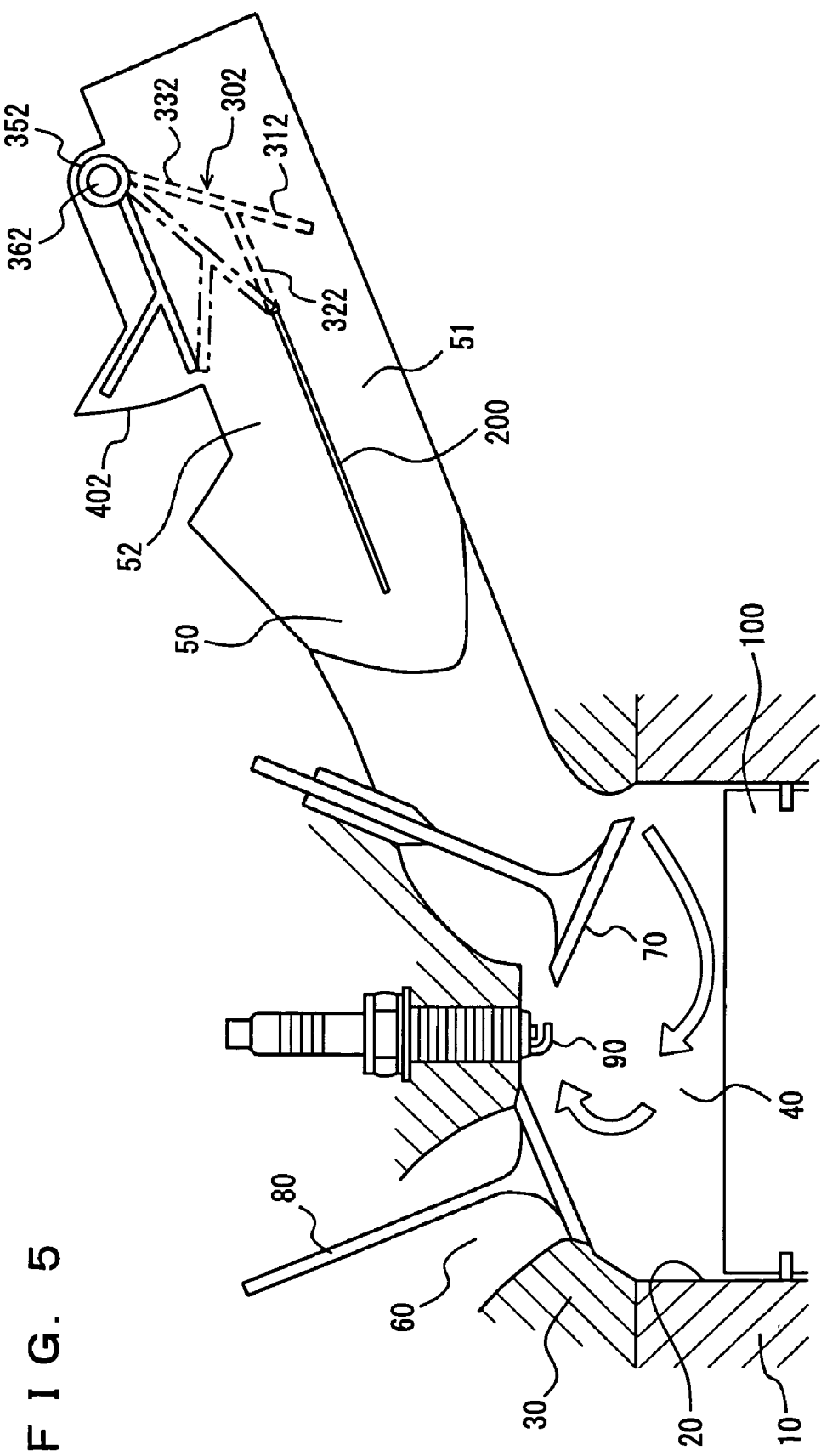
FIG. 5 is a cross-sectional view showing an overall structure of an air intake apparatus according to Embodiment 2 of the present invention.

As shown in FIG. 5, in the present embodiment as in Embodiment 1, partition wall 200 is provided along the longitudinal direction of intake port 50, so as to cross-sectionally partition intake port 50 into two upper and lower sections.

In the portion where partition wall 200 is present, the space within intake port 50 is divided into the lower passage portion, that is, first flow path 51, and the upper passage portion, that is, second flow path 52. Intake control valve 302 is provided for each cylinder, so as to block upper second flow path 52 on an inlet side, that is, at an upstream end. Intake control valve 302 is provided on an extension line of partition wall 200, particularly adjacent to the upstream end portion of partition wall 200.

Intake control valve 302 is constituted of a dogleg-shaped flat plate and a blocking portion 312 extending straight from a bent point of the flat plate. The dogleg-shaped flat plate implements a partition wall connection portion 322 and a main portion 332. That is, intake control valve 302 is constituted of main portion 332 coupled to a rotation shaft 362, blocking portion 312 extending straight from main portion 332, and partition wall connection portion 322 branched from main portion 332.

Main portion 332 is coupled to rotation shaft 362, and rotation shaft 362 is supported by a rotation shaft supporting portion 352 such that intake control valve 302 is pivotable. Rotation shaft 362 is coupled to a rotation shaft of a motor controlled by the engine ECU, which rotates intake control valve 302.

In addition, an accommodation portion 402 for accommodating partition wall connection portion 322 is provided in upper second flow path 52.

As shown with a solid line in FIG. 5, intake control valve 302 attains the full-open state as the first state. This is shown in FIG. 5 as a state of intake control valve 302 pivoted as far as an uppermost position. Here, intake control valve 302 pivots such that blocking portion 312 extends along and in parallel to the wall surface of intake port 50, thereby implementing lower first flow path 51 and upper second flow path 52. Here, partition wall connection portion 322 is stored in accommodation portion 402.

As shown with a dashed line in FIG. 5, intake control valve 302 attains the half-open state as the second state. Here, intake control valve 302 pivots such that blocking portion 312 is connected to the upstream end portion of partition wall 200, thereby closing upper second flow path 52. Here, partition wall connection portion 322 may be positioned so as to cover accommodation portion 402.

As shown with a dotted line in FIG. 5, intake control valve 302 attains the slightly-open state as the third state. Here, intake control valve 302 pivots such that partition wall connection portion 322 is connected to the upstream end portion of partition wall 200, thereby closing upper second flow path 52. Here, a gap is formed between blocking portion 312 and lower first flow path 51, so as to narrow lower first flow path 51.

An effect of the structure described above will now be discussed. It is noted that the engine ECU controls intake control valve 302 such that intake control valve 302 attains the first state (full-open state) when the engine is in the first operation state (WOT), intake control valve 302 attains the second state (half-open state) when the engine is in the second operation state (partial throttle state), and intake control valve 302 attains the third state (slightly-open state) when the engine is in the third operation state (cold state) described in Embodiment 1 above.

Here, in the second state and in the third state, when intake control valve 302 is controlled to the half-open position or to the slightly-open position, upper second flow path 52 is blocked, so that the intake air flows toward cylinder 20 side only through lower first flow path 51 or only through narrowed first flow path 51. In particular, the intake air flow is present locally along the lower inner wall surface of intake port 50, and there is little flow along the upper inner wall surface of intake port 50. Therefore, when attention is paid to the space around intake valve 70, in a gap above intake valve 70, that is, in the gap closer to the center of cylinder 20, flow rate of the intake air is small and flow velocity is also low. Meanwhile, in a gap under intake valve 70, that is, in a gap distant from spark plug 90, flow rate of the intake air is large and flow velocity is also high. Consequently, as shown with an arrow in FIG. 5, tumble (what is called reverse tumble) flowing from intake valve 70 side toward the top surface of piston 100 and exhaust valve 80 side is generated in cylinder 20.

Substantially similarly to the forward tumble, the reverse tumble also whirls the intake air along the axial direction of the cylinder. Then, the tumble breaks up in the latter half of the compression stroke and a strong turbulent flow is generated. Accordingly, combustion is improved. Consequently, in the cold state of the engine, further leaner lean limit can be achieved and fuel efficiency can be improved. In the partial throttle state of the engine, improvement in combustion performance is achieved, whereby further leaner combustion can be realized and fuel efficiency can be improved.

As described above, in accordance with the operation state of the engine, the cross-sectional area of the passage for the intake air is varied by means of the intake control valve for generating the reverse tumble in the air intake apparatus. Here, the intake control valve is shaped, in consideration of connection with the partition wall upstream end portion and accommodation in the accommodation portion. Therefore, the airflow within the cylinder can be strengthened without a complicated structure.

Embodiment 3

In the following, an air intake apparatus for an internal combustion engine according to Embodiment 3 of the present invention will be described. In the air intake apparatus for the internal combustion engine according to the present embodiment, an intake control valve 500 having a shape different from intake control valve 300 in the air intake apparatus for the internal combustion engine according to Embodiment 1 and intake control valve 302 in the air intake apparatus for the internal combustion engine according to Embodiment 2 described previously is provided. As the structure of the engine or the like is otherwise similar to that in Embodiment 1 described above, detailed description thereof will not be repeated.

Figure 6:
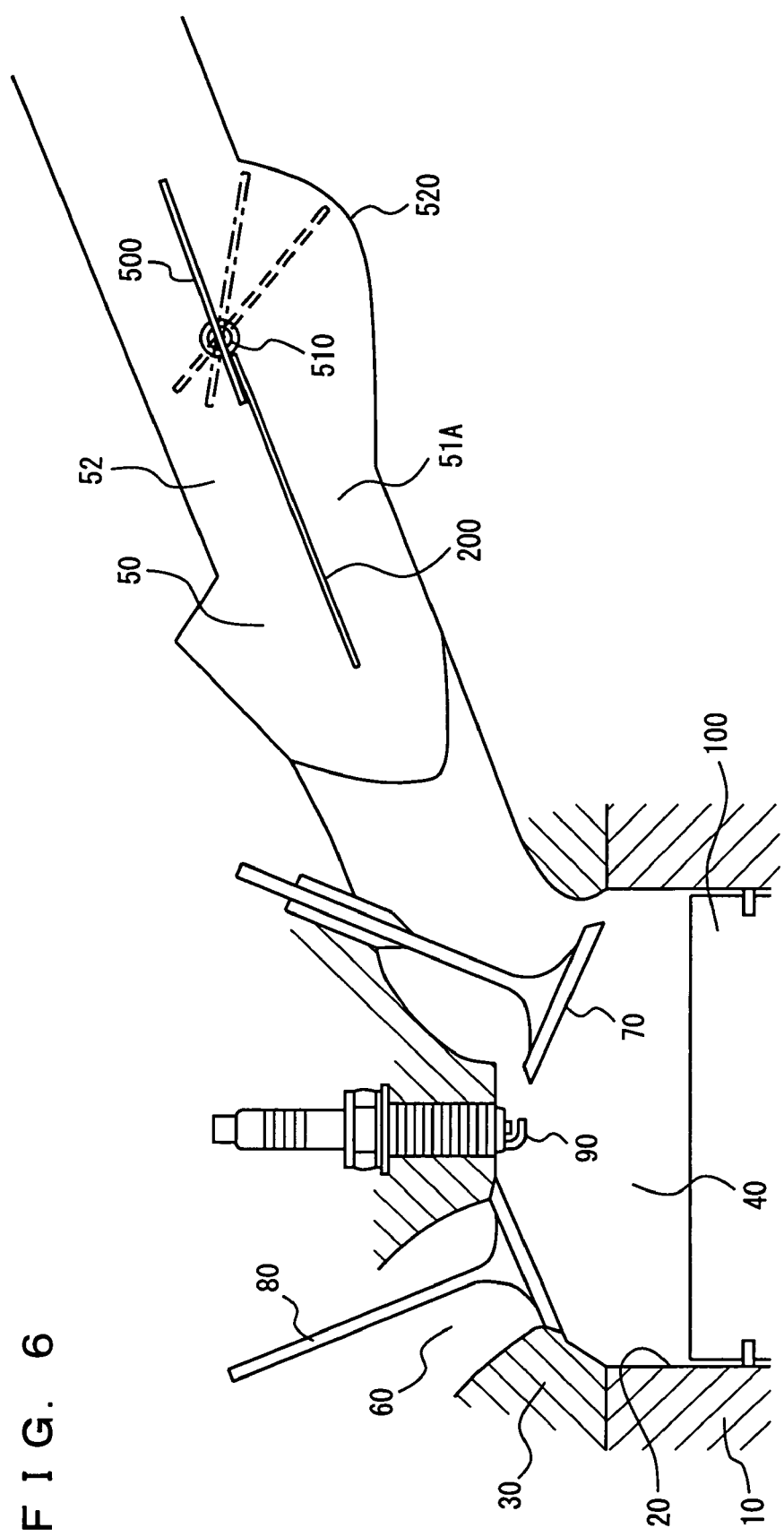
FIG. 6 is a cross-sectional view showing an overall structure of an air intake apparatus according to Embodiment 3 of the present invention.

As shown in FIGS. 6 and 7, in the present embodiment as in Embodiment 1, partition wall 200 is provided along the longitudinal direction of intake port 50, so as to cross-sectionally partition intake port 50 into two upper and lower sections. It is noted here that an expanded portion 520 in such a shape that the pipe forming the intake port is outwardly expanded is provided in a lower flow path 51A. Expanded portion 520 has a smooth inner surface in order to lower fluid resistance.

As shown in FIGS. 6 and 7, intake control valve 500 is constituted of a valve element having a flat plate shape, a rotation shaft 512 provided in a position displaced from the center of the valve element, and a rotation shaft supporting portion 510 supporting rotation shaft 512. Rotation shaft 512 is provided at the upstream end portion of partition wall 200 and in the vicinity of approximate center of the intake port.

As shown with a solid line in FIGS. 6 and 7, intake control valve 500 attains the full-open state as the first state. This is shown in FIGS. 6 and 7 as a state of intake control valve 500 pivoted as far as the uppermost position. Here, intake control valve 500 pivots such that the flat plate serving as the valve element of intake control valve 500 extends substantially in line with partition wall 200, thereby implementing lower first flow path 51A and upper second flow path 52. Here, as the inner wall of expanded portion 520 provided in lower flow path 51A is smooth, it does not serve as fluid resistance.

As shown with a dashed line in FIGS. 6 and 7, intake control valve 500 attains the half-open state as the second state. This is shown in FIGS. 6 and 7 as a state of intake control valve 500 pivoted as far as a position intermediate between the uppermost position and a lowermost position. Here, intake control valve 500 pivots such that an end portion of a longer-length portion of intake control valve 500 is connected to an upstream end portion of expanded portion 520, whereby lower first flow path 51A is closed. In addition, an end portion of a shorter-length portion of intake control valve 500 partially narrows upper flow path 52.

Moreover, as shown with a dotted line in FIGS. 6 and 7, intake control valve 500 attains the slightly-open state as the third state. This is shown in FIGS. 6 and 7 as a state of intake control valve 500 pivoted as far as the lowermost position. Here, intake control valve 500 pivots such that the end portion of the longer-length portion of intake control valve 500 is connected to a bottom portion of expanded portion 520, whereby lower first flow path 51A is closed. In addition, the end portion of the shorter-length portion of intake control valve 500 narrows upper flow path 52. The end portion of the shorter-length portion of intake control valve 500 narrows upper flow path 52 further in the third state than in the second state.

An effect of the structure described above will now be discussed. It is noted that the engine ECU controls intake control valve 500 such that intake control valve 500 attains the first state (full-open state) when the engine is in the first operation state (WOT), intake control valve 500 attains the second state (half-open state) when the engine is in the second operation state (partial throttle state), and intake control valve 500 attains the third state (slightly-open state) when the engine is in the third operation state (cold state) described in Embodiment 1 above.

Here, in the second state and in the third state, when intake control valve 500 is controlled to the half-open position or to the slightly-open position, lower first flow path 51A is blocked, so that the intake air flows toward cylinder 20 side only through upper second flow path 52 or only through narrowed second flow path 52. In particular, the intake air flow is present along the upper inner wall surface of intake port 50 further locally than when intake control valve 500 is at the full-open position (first state), and there is further less flow along the lower inner wall surface of intake port 50. Therefore, when attention is paid to the space around intake valve 70, in a gap under intake valve 70, that is, in the gap closer to the outer perimeter of cylinder 20, flow rate of the intake air is small and flow velocity is also low. Meanwhile, in a gap above intake valve 70, that is, in the gap closer to spark plug 90, flow rate of the intake air is large and flow velocity is also high. Consequently, the tumble (what is called forward tumble) flowing from intake valve 70 side toward exhaust valve 80 side and the top surface of piston 100 is generated in cylinder 20.

The tumble whirls the intake air along the axial direction of the cylinder. Then, the tumble breaks up in the latter half of the compression stroke and a strong turbulent flow is generated. Accordingly, combustion is improved. Consequently, in the cold state of the engine, lean limit can further be leaner and fuel efficiency can be improved. In the partial throttle state of the engine, improvement in combustion performance is achieved, whereby further leaner combustion can be realized and fuel efficiency can be improved.

As described above, in accordance with the operation state of the engine, the cross-sectional area of the passage for the intake air is varied by means of the intake control valve for generating the tumble in the air intake apparatus. Here, the intake control valve is shaped, in consideration of connection with the partition wall upstream end portion and accommodation in the accommodation portion. Therefore, the airflow within the cylinder can be strengthened without a complicated structure.

In the present embodiment, it is noted that the gap between intake control valve 500 and partition wall 200 is negligible, and the intake air does not flow through this gap.

Embodiment 4

In the following, an air intake apparatus for an internal combustion engine according to Embodiment 4 of the present invention will be described. The air intake apparatus for the internal combustion engine according to the present embodiment has intake valve 500 the same as that in the air intake apparatus for the internal combustion engine according to Embodiment 3 described above, however, Embodiment 4 is different from Embodiment 3 in a shape of the upstream end portion of partition wall 200. As the structure of the engine or the like is otherwise similar to that in Embodiment 3 described above, detailed description thereof will not be repeated.

Figure 8:
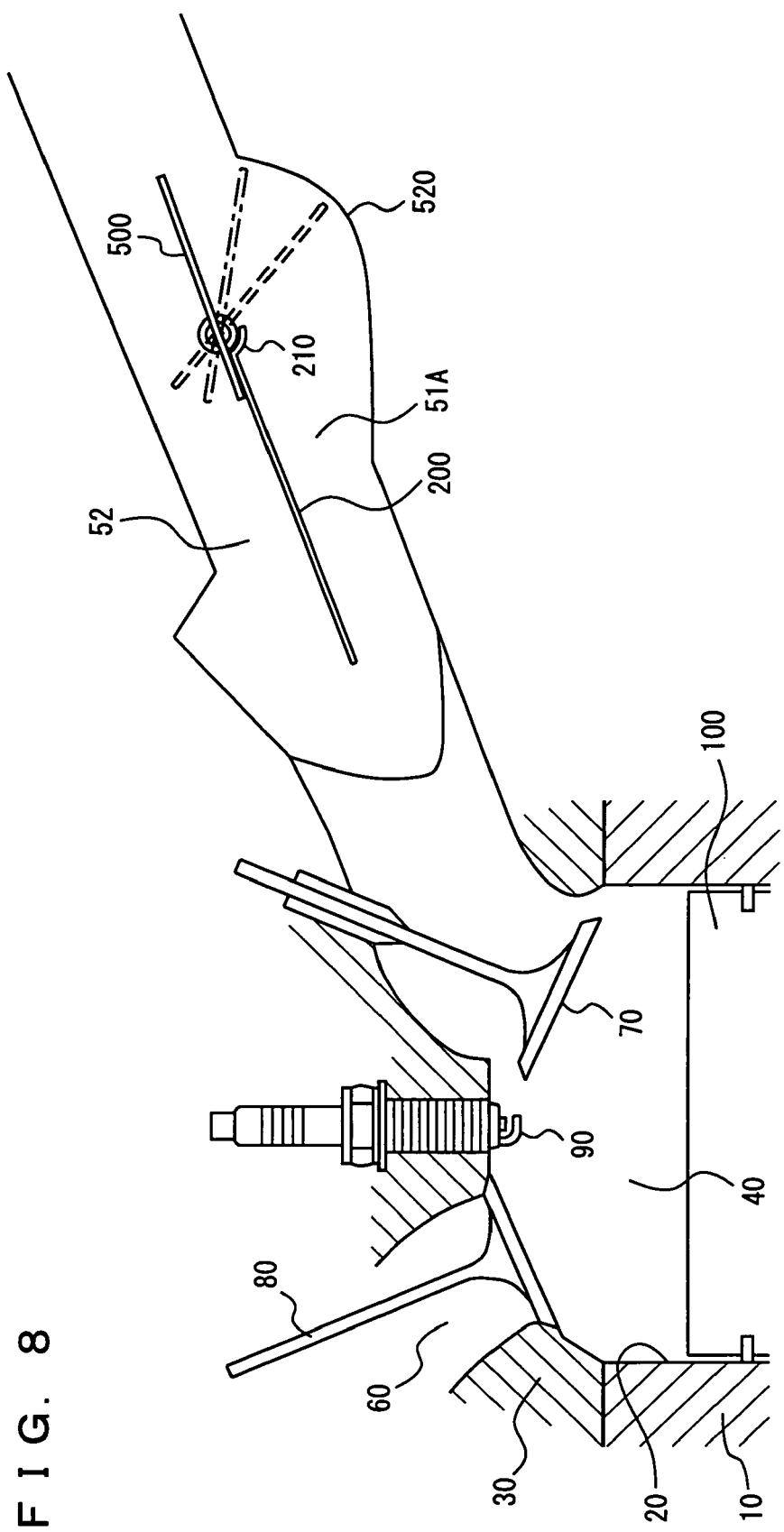
FIG. 8 is a cross-sectional view showing an overall structure of an air intake apparatus according to Embodiment 4 of the present invention.
Figure 9:
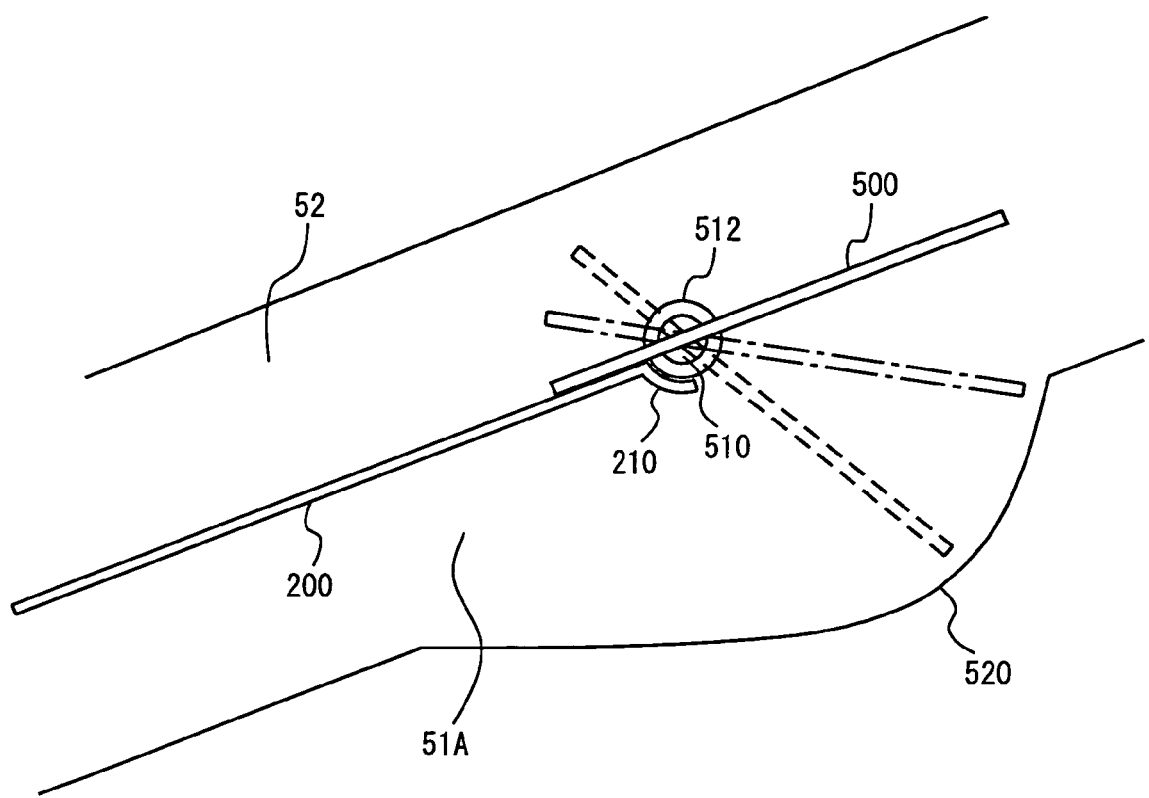
FIG. 9 is a partially enlarged view of FIG. 8.

As shown in FIGS. 8 and 9, in the present embodiment as in Embodiment 3, partition wall 200 is provided along the longitudinal direction of intake port 50, so as to cross-sectionally partition intake port 50 into two upper and lower sections. It is noted here that a partition wall end portion 210 is provided at the upstream end portion of partition wall 200.

Partition wall end portion 210 has an arch shape in order to support rotation shaft supporting portion 510 and to reduce fluid resistance. In the present embodiment, it is noted that the gap between intake control valve 500 and partition wall 200 is negligible, and the intake air does not flow through this gap.

Embodiment 5

In the following, an air intake apparatus for an internal combustion engine according to Embodiment 5 of the present invention will be described. The air intake apparatus for the internal combustion engine according to the present embodiment is different from that according to Embodiment 1 described previously, in having an intake valve 600 having a shape different from intake control valve 300 and not having partition wall 200. As the structure of the engine or the like is otherwise similar to that in Embodiment 1 described above, detailed description thereof will not be repeated.

Figure 10:
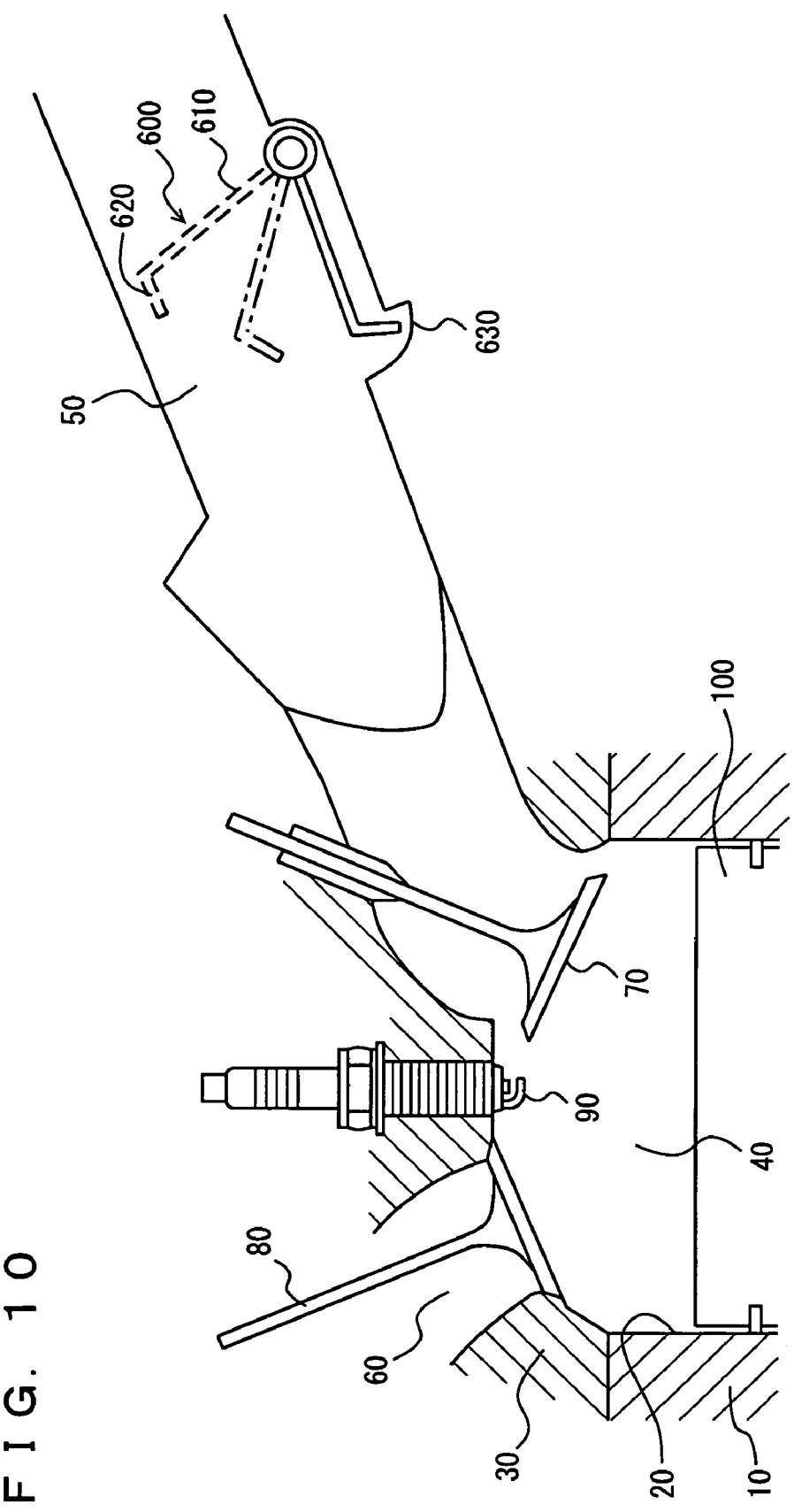
FIG. 10 is a cross-sectional view showing an overall structure of an air intake apparatus according to Embodiment 5 of the present invention.

As shown in FIG. 10, in the present embodiment, unlike the embodiments described previously, partition wall 200 for cross-sectionally partitioning intake port 50 into two upper and lower sections is not provided.

Intake control valve 600 is implemented by an L-shaped flat plate. In other words, intake control valve 600 is constituted of a blocking portion 610 which is a longer-length side of the L-shape connected to a rotation shaft and a straightening portion 620 which is a shorter-length side of the L-shape.

Blocking portion 610 is coupled to the rotation shaft, and the rotation shaft is supported by a rotation shaft supporting portion such that intake control valve 600 is pivotable around the wall surface of intake port 50. The rotation shaft is coupled to a rotation shaft of a motor controlled by the engine ECU, which rotates intake control valve 600.

In addition, an accommodation portion 630 for accommodating straightening portion 620 is provided in the lower first flow path.

As shown with a solid line in FIG. 10, intake control valve 600 attains the full-open state as the first state. This is shown in FIG. 10 as a state of intake control valve 600 pivoted as far as the lowermost position. Here, intake control valve 600 pivots such that blocking portion 610 extends along and in parallel to the wall surface of intake port 50, thereby implementing the lower first flow path and the upper second flow path. Here, straightening portion 620 is stored in accommodation portion 630.

In addition, as shown with a dashed line in FIG. 10, intake control valve 600 attains the half-open state as the second state. This is shown in FIG. 10 as a state of intake control valve 600, i.e., the end portion of blocking portion 610, pivoted to a position in the vicinity of the center of intake port 50. The lower first flow path is thus closed.

Moreover, as shown with a dotted line in FIG. 10, intake control valve 600 attains the slightly-open state as the third state. This is shown in FIG. 10 as a state of intake control valve 600 pivoted as far as the uppermost position. Here, intake control valve 600 pivots such that straightening portion 620 extends along and in parallel to the wall surface of intake port 50, thereby closing the lower first flow path. In addition, a gap is formed between straightening portion 620 and the upper second flow path, so as to narrow the upper second flow path.

An effect of the structure described above will now be discussed. It is noted that the engine ECU controls intake control valve 600 such that intake control valve 600 attains the first state (full-open state) when the engine is in the first operation state (WOT), intake control valve 600 attains the second state (half-open state) when the engine is in the second operation state (partial throttle state), and intake control valve 600 attains the third state (slightly-open state) when the engine is in the third operation state (cold state) described in Embodiment 1 above.

Here, in the second state and in the third state, when intake control valve 600 is controlled to the half-open position or to the slightly-open position, the lower first flow path is blocked, so that the intake air flows toward cylinder 20 side only through the upper second flow path or only through the narrowed second flow path. In particular, the intake air flow is present along the upper inner wall surface of intake port 50 further locally than when intake control valve 600 is at the full-open position (first state), and there is further less flow along the lower inner wall surface of intake port 50. Therefore, when attention is paid to the space around intake valve 70, in a gap under intake valve 70, that is, in the gap closer to the outer perimeter of cylinder 20, flow rate of the intake air is small and flow velocity is also low. Meanwhile, in a gap above intake valve 70, that is, in the gap closer to spark plug 90, flow rate of the intake air is large and flow velocity is also high. Consequently, the tumble (what is called forward tumble) flowing from intake valve 70 side toward exhaust valve 80 side and the top surface of piston 100 is generated in cylinder 20.

The tumble whirls the intake air along the axial direction of the cylinder. Then, the tumble breaks up in the latter half of the compression stroke and a strong turbulent flow is generated. Accordingly, combustion can be improved. Consequently, in the cold state of the engine, lean limit can further be leaner and fuel efficiency can be improved. In the partial throttle state of the engine, improvement in combustion performance is achieved, whereby further leaner combustion can be realized and fuel efficiency can be improved.

As described above, in accordance with the operation state of the engine, the cross-sectional area of the passage for the intake air is varied by means of the intake control valve for generating the tumble in the air intake apparatus. Here, the partition wall is not provided. Therefore, the airflow within the cylinder can be strengthened without a complicated structure. It is noted that intake control valve 600 does not need to have straightening portion 620. Alternatively, the air intake apparatus may have a partition wall as in the embodiments described previously, in addition to intake control valve 600.

Embodiment 6

In the following, an air intake apparatus for an internal combustion engine according to Embodiment 6 of the present invention will be described. The air intake apparatus for the internal combustion engine according to the present embodiment is the same as that according to Embodiment 3 described above in having the intake control valve the same as intake control valve 500, and different therefrom in not having partition wall 200. As the structure of the engine or the like is otherwise similar to that in Embodiment 3 described above, detailed description thereof will not be repeated.

Figure 11:
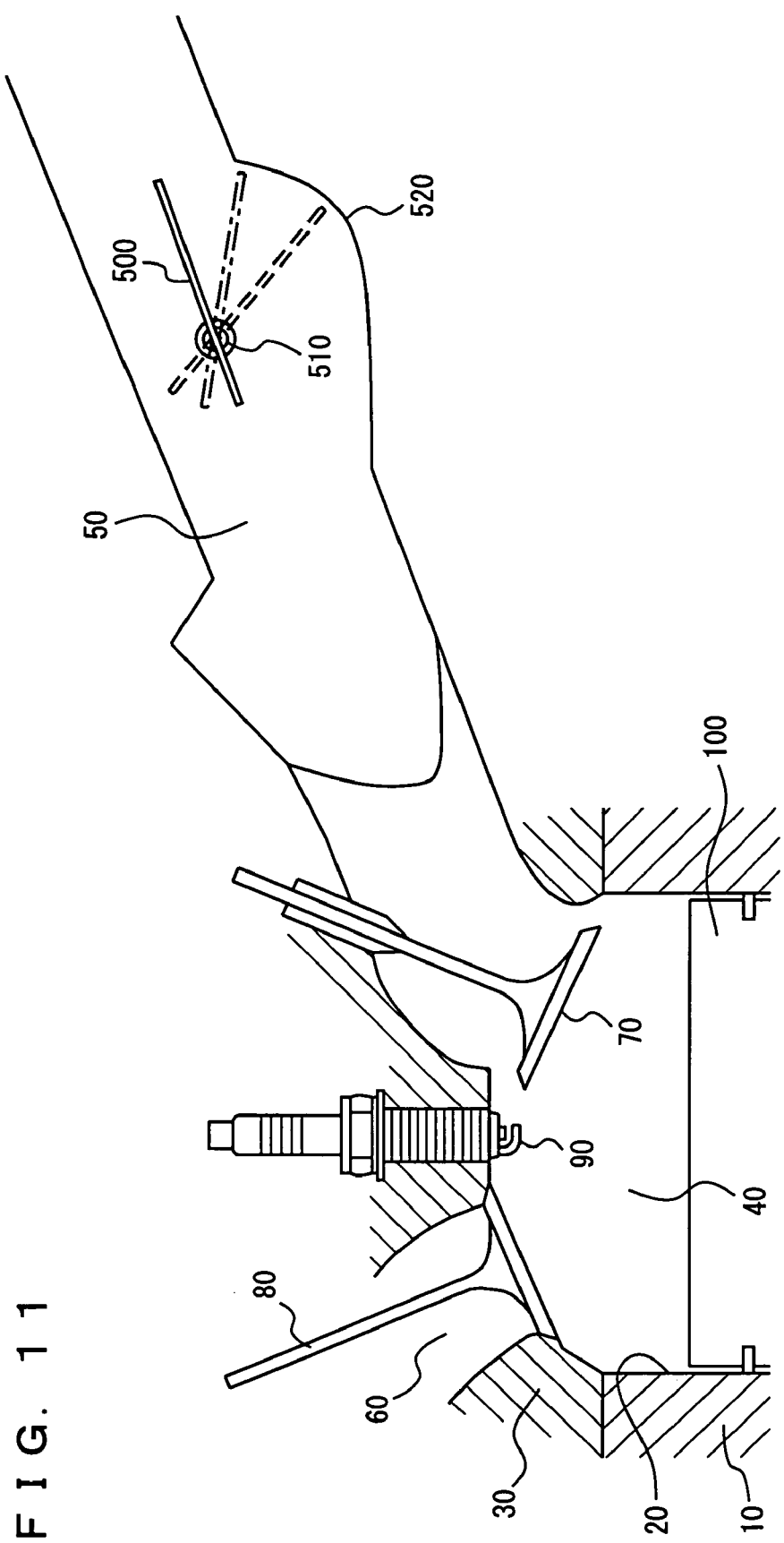
FIG. 11 is a cross-sectional view showing an overall structure of an air intake apparatus according to Embodiment 6 of the present invention.

As shown in FIG. 11, in the present embodiment, unlike the embodiments described previously, partition wall 200 for cross-sectionally partitioning intake port 50 into two upper and lower sections is not provided. This is the only difference from the air intake apparatus for the internal combustion engine according to Embodiment 3.

Intake control valve 500 is controlled, so as to attain the full-open state (the state shown with a solid line in FIG. 11) in accordance with the engine in the first operation state (WOT), so as to attain the half-open state (the state shown with a dashed line in FIG. 11) in accordance with the engine in the second operation state (partial throttle state), and so as to attain the slightly-open state (the state shown with a dotted line in FIG. 1) in accordance with the engine in the third operation state (cold state).

Even without partition wall 200, when intake control valve 500 is controlled to the half-open state and the slightly-open state, the lower first flow path is blocked, so that the intake air flows toward cylinder 20 side only through the upper second flow path or only through the narrowed second flow path. In particular, the intake air flow is present along the upper inner wall surface of intake port 50 further locally than when intake control valve 500 is at the full-open position (first state), and there is further less flow along the lower inner wall surface of intake port 50. Therefore, when attention is paid to the space around intake valve 70, in a gap under intake valve 70, that is, in the gap closer to the outer perimeter of cylinder 20, flow rate of the intake air is small and flow velocity is also low. Meanwhile, in a gap above intake valve 70, that is, in the gap closer to spark plug 90, flow rate of the intake air is large and flow velocity is also high. Consequently, the tumble (what is called forward tumble) flowing from intake valve 70 side toward exhaust valve 80 side and the top surface of piston 100 is generated in cylinder 20.

The tumble whirls the intake air along the axial direction of the cylinder. Then, the tumble breaks up in the latter half of the compression stroke and a strong turbulent flow is generated. Accordingly, combustion can be improved. Consequently, in the cold state of the engine, lean limit can further be leaner and fuel efficiency can be improved. In the partial throttle state of the engine, improvement in combustion performance is achieved, whereby further leaner combustion can be realized and fuel efficiency can be improved.

As described above, in accordance with the operation state of the engine, the cross-sectional area of the passage for the intake air is varied by means of the intake control valve for generating the tumble in the air intake apparatus. Here, the partition wall is not provided. Therefore, the airflow within the cylinder can be strengthened without a complicated structure.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An air intake apparatus for an internal combustion engine in which an intake port is connected to a cylinder of the internal combustion engine and an intake valve opens and closes a downstream end of said intake port, comprising:
   a partition wall provided along a longitudinal direction of said intake port so as to cross-sectionally partition said intake port into two sections; and
   an intake control valve provided in a pipe forming said intake port and having an opening/closing mechanism opening and closing a first flow path implemented by partition by said partition wall and a valve element pivoted by said opening/closing mechanism and having a blocking plate for closing said first flow path and narrowing a second flow path different from said first flow path; wherein
   if a sliding direction of a piston within said cylinder is assumed as an up-down direction, said two sections are implemented as upper and lower sections,
   wherein said intake control valve attains
      a first state in which the first flow path is opened by said opening/closing mechanism, without said second flow path being narrowed by said blocking plate,
      a second state in which the first flow path is closed by said opening/closing mechanism, without said second flow path being narrowed by said blocking plate, and
      a third state in which the first flow path is closed by said opening/closing mechanism and said second flow path is narrowed by said blocking plate.

2. The air intake apparatus for an internal combustion engine according to claim 1, further comprising a control unit for switching between said first state, said second state, and said third state, in accordance with three operation regions set in advance based on at least one of a temperature of said internal combustion engine and an intake air quantity.

3. The air intake apparatus for an internal combustion engine according to claim 2, wherein
   said control unit controls
   said intake control valve so as to attain said first state in accordance with first said operation region,
   said intake control valve so as to attain said second state in accordance with second said operation region, and
   said intake control valve so as to attain said third state in accordance with third said operation region, and
   in said first operation region, the intake air quantity is large, and in said third operation region, the temperature of the internal combustion engine is low.

4. The air intake apparatus for an internal combustion engine according to claim 2, wherein
   said opening/closing mechanism has a rotation shaft for said valve element to pivot around a position in a wall surface of said pipe,
   said valve element is constituted of a dogleg-shaped flat plate and a blocking plate extending straight from a bent point of said flat plate,
   said dogleg-shaped flat plate has a first end portion supported by the rotation shaft,
   in said third state, a gap is formed between an end portion of said blocking plate and the wall surface of the pipe to narrow said second flow path, and a second end portion of said dogleg-shaped flat plate opposite to said first end portion continues substantially in line with said partition wall to close said first flow path,
   in said second state, the end portion of said blocking plate and said partition wall are connected to each other to close said first flow path, and in said first state, said blocking plate extends along and in parallel to the wall surface of the pipe, to implement said first flow path and said second flow path.

5. The air intake apparatus for an internal combustion engine according to claim 4, wherein
in said wall surface of the pipe, an accommodation portion accommodating said second end portion in said first state is provided in a manner projecting in a radial direction of said pipe.

6. The air intake apparatus for an internal combustion engine according to claim 2, wherein
said opening/closing mechanism has a rotation shaft for said valve element to pivot around a substantially central position of said pipe,
said valve element is implemented by a flat plate and supported by the rotation shaft at a position displaced from a center of said flat plate,
said first flow path has an expanded portion expanded in a radial direction of said pipe and having a shape conforming to an end portion of a longer-length portion of the flat plate serving as said valve element,
in said third state, an inner wall of said expanded portion and the end portion of the longer-length portion are connected to each other to close said first flow path, and an end portion of a shorter-length portion opposite to said end portion of the longer-length portion protrudes so as to narrow said second flow path,
in said second state, the inner wall of said expanded portion and the end portion of the longer-length portion are connected to each other to close said first flow path, and the end portion of the shorter-length portion opposite to said end portion of the longer-length portion protrudes in a degree lower than in said first state, so as to narrow said second flow path, and
in said first state, said flat plate and said partition wall are caused to extend substantially in line, to implement said first flow path and said second flow path.

7. An air intake apparatus for an internal combustion engine in which an intake port is connected to a cylinder of the internal combustion engine and an intake valve opens and closes a downstream end of said intake port, comprising:
an intake control valve provided in a pipe forming said intake port and having a valve element and an opening/closing mechanism pivoting said valve element; wherein
said opening/closing mechanism has a rotation shaft for said valve element to pivot around a position in a wall surface of said pipe,
if a sliding direction of a piston within said cylinder is assumed as an up-down direction, said valve element is implemented by a plate-shaped member forming a gap between an upper end portion of said valve element and the wall surface of the pipe and having a lower end portion conforming to inner shape of said pipe so as to form no gap, and
said rotation shaft is provided in said lower end portion, wherein said intake control valve attains
a third state in which said valve element is pivoted around said rotation shaft to an uppermost position, to form a gap between the upper end portion of said valve element and the wall surface of the pipe,
a first state in which said valve element is pivoted around said rotation shaft to a lowermost position, to extend along and in parallel to the wall surface of the pipe, and
a second state intermediate between said first state and said third state;
a control unit for switching between said first state, said second state, and said third state, in accordance with three operation regions set in advance based on at least one of a temperature of said internal combustion engine and an intake air quantity, and
wherein said control unit controls
said intake control valve so as to attain said first state in accordance with first said operation region,
said intake control valve so as to attain said second state in accordance with second said operation region, and
said intake control valve so as to attain said third state in accordance with third said operation region, and
in said first operation region, the intake air quantity is large, and in said third operation region, the temperature of the internal combustion engine is low.

8. The air intake apparatus for an internal combustion engine according to claim 7, further comprising a partition wall provided along a longitudinal direction of said intake port so as to cross-sectionally partition said intake port into two upper and lower sections.

9. An air intake apparatus for an internal combustion engine in which an intake port is connected to a cylinder of the internal combustion engine and an intake valve opens and closes a downstream end of said intake port, comprising:
an intake control valve provided in a pipe forming said intake port and having a valve element and an opening/closing mechanism pivoting said valve element; wherein
said opening/closing mechanism has a rotation shaft for said valve element to pivot around a position in a wall surface of said pipe,
if a sliding direction of a piston within said cylinder is assumed as an up-down direction, said valve element is implemented by a plate-shaped member forming a gap between a lower end portion of said valve element and the wall surface of the pipe and having an upper end portion conforming to inner shape of said pipe so as to form no gap, and
said rotation shaft is provided in said lower end portion, wherein said intake control valve attains
a third state in which said valve element is pivoted around said rotation shaft to an uppermost position, to form a gap between the upper end portion of said valve element and the wall surface of the pipe,
a first state in which said valve element is pivoted around said rotation shaft to a lowermost position, to extend along and in parallel to the wall surface of the pipe, and
a second state intermediate between said first state and said third state;
a control unit for switching between said first state, said second state, and said third state, in accordance with three operation regions set in advance based on at least one of a temperature of said internal combustion engine and an intake air quantity, and
wherein said control unit controls
said intake control valve so as to attain said first state in accordance with first said operation region,
said intake control valve so as to attain said second state in accordance with second said operation region, and
said intake control valve so as to attain said third state in accordance with third said operation region, and in said first operation region, the intake air quantity is large, and in said third operation region, the temperature of the internal combustion engine is low.

10. An air intake apparatus for an internal combustion engine in which an intake port is connected to a cylinder of the internal combustion engine and an intake valve opens and closes a downstream end of said intake port, comprising:

an intake control valve provided in a pipe forming said intake port and having a valve element and an opening/closing mechanism pivoting said valve element; wherein if a sliding direction of a piston within said cylinder is assumed as an up-down direction, said intake port is assumed to be partitioned into a first flow path and a second flow path, said opening/closing mechanism has a rotation shaft for said valve element to pivot around a substantially central position of said pipe, said valve element is implemented by a flat plate and supported by the rotation shaft at a position displaced from a center of said flat plate, said first flow path has an expanded portion expanded in a radial direction of said pipe and having a cross-sectional shape conforming to an end portion of a longer-length portion of the flat plate serving as said valve element, and said intake control valve attains a third state in which an inner wall of said expanded portion and said end portion of the longer-length portion are connected to each other to close said first flow path and an end portion of a shorter-length portion opposite to said end portion of the longer-length portion protrudes so as to narrow said second flow path, a second state in which the inner wall of said expanded portion and the end portion of the longer-length portion are connected to each other to close said first flow path and the end portion of the shorter-length portion opposite to said end portion of the longer-length portion protrudes in a degree lower than in said first state, and a first state in which said flat plate and said partition wall are caused to extend substantially in line, to implement said first flow path and said second flow path.

11. An air intake apparatus for an internal combustion engine in which an intake port is connected to a cylinder of the internal combustion engine and an intake valve opens and closes a downstream end of said intake port, comprising:

partition wall provided along a longitudinal direction of said intake port so as to cross-sectionally partition said intake port into two sections; and an intake control valve provided in a pipe forming said intake port and having a valve element and an opening/closing mechanism pivoting said valve element; wherein if a sliding direction of a piston within said cylinder is assumed as an up-down direction, said intake port is partitioned into a first flow path and a second flow path representing upper and lower said two sections, said opening/closing mechanism has a rotation shaft for said valve element to pivot around a position in a wall surface of said pipe, said valve element is implemented by a flat plate and supported by the rotation shaft at a position at an end portion of said flat plate, said intake control valve attains a third state in which an end portion opposite to the end portion supported by said rotation shaft approaches a wall surface opposite to the wall surface on a side where said rotation shaft is supported, so as to block airflow to said first flow path and to narrow said second flow path, a second state in which said end portion on the opposite side approaches said end portion of said partition wall, to close said first flow path, and a first state in which said flat plate extends along the wall surface of said pipe, to implement said first flow path and said second flow path, said air intake apparatus for an internal combustion engine further comprises a control unit for switching between said first state, said second state, and said third state, in accordance with three operation regions set in advance based on at least one of a temperature of said internal combustion engine and an intake air quantity, said control unit controls said intake control valve so as to attain said first state in accordance with first said operation region, said intake control valve so as to attain said second state in accordance with second said operation region, and said intake control valve so as to attain said third state in accordance with third said operation region, and in said first operation region, the intake air quantity is large, and in said third operation region, the temperature of the internal combustion engine is low.

* * * * *

UNITED STATES PATENT AND TRADEMARK OFFICE
CERTIFICATE OF CORRECTION

PATENT NO.        : 7,128,050 B1
APPLICATION NO. : 11/155916
DATED             : October 31, 2006
INVENTOR(S)       : Kazuyoshi Abe It is certified that error appears in the above-identified patent and that said Letters Patent is hereby corrected as shown below:

On The Title Page: Item (73) should read

-- (73)   Assignee:   Toyota Jidosha Kabushiki Kaisha,
                      Toyota, Japan --

Signed and Sealed this

Twenty-third Day of January, 2007

JON W. DUDAS
*Director of the United States Patent and Trademark Office*